(12) United States Patent
Uekusa

(10) Patent No.: US 12,401,886 B2
(45) Date of Patent: Aug. 26, 2025

(54) ELECTRONIC DEVICE, CONTROL METHOD, AND NON-TRANSITORY COMPUTER READABLE MEDIUM

(71) Applicant: CANON KABUSHIKI KAISHA, Tokyo (JP)

(72) Inventor: Tomotaka Uekusa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 18/297,665

(22) Filed: Apr. 10, 2023

(65) Prior Publication Data

US 2023/0336862 A1 Oct. 19, 2023

(30) Foreign Application Priority Data

Apr. 14, 2022 (JP) ................. 2022-066950

(51) Int. Cl.
*H04N 23/62* (2023.01)
*G06F 3/01* (2006.01)
*G06T 7/50* (2017.01)
*G06T 7/70* (2017.01)
*G06V 40/18* (2022.01)
*H04N 23/61* (2023.01)
*H04N 23/63* (2023.01)

(52) U.S. Cl.
CPC ............. *H04N 23/62* (2023.01); *G06F 3/013* (2013.01); *G06T 7/50* (2017.01); *G06T 7/70* (2017.01); *G06V 40/18* (2022.01); *H04N 23/61* (2023.01); *H04N 23/633* (2023.01); *G06T 2200/24* (2013.01); *G06T 2207/10024* (2013.01); *G06T 2207/30196* (2013.01)

(58) Field of Classification Search
None
See application file for complete search history.

(56) References Cited

U.S. PATENT DOCUMENTS

| 9,894,339 | B2 | 2/2018 | Uekusa et al. |
| 10,015,431 | B2 | 7/2018 | Uekusa et al. |
| 2020/0358984 | A1* | 11/2020 | Wang ..................... H04N 7/181 |

FOREIGN PATENT DOCUMENTS

| JP | 2021-67853 A | 4/2021 |
| JP | 2021-108447 A | 7/2021 |

* cited by examiner

*Primary Examiner* — Christopher Braniff
(74) *Attorney, Agent, or Firm* — Carter, DeLuca & Farrell LLP

(57) ABSTRACT

An electronic device includes a processor, and a memory storing a program which, when executed by the processor, causes the electronic device to detect an eyepoint of a user in an image which is captured by an imaging unit and is displayed in a display unit, track a plurality of subjects in the image, determine an attention degree of the user of each of the plurality of subjects based on the eyepoint of the user, and select any of the plurality of subjects as a main subject based on the attention degree of each of the plurality of subjects.

18 Claims, 15 Drawing Sheets

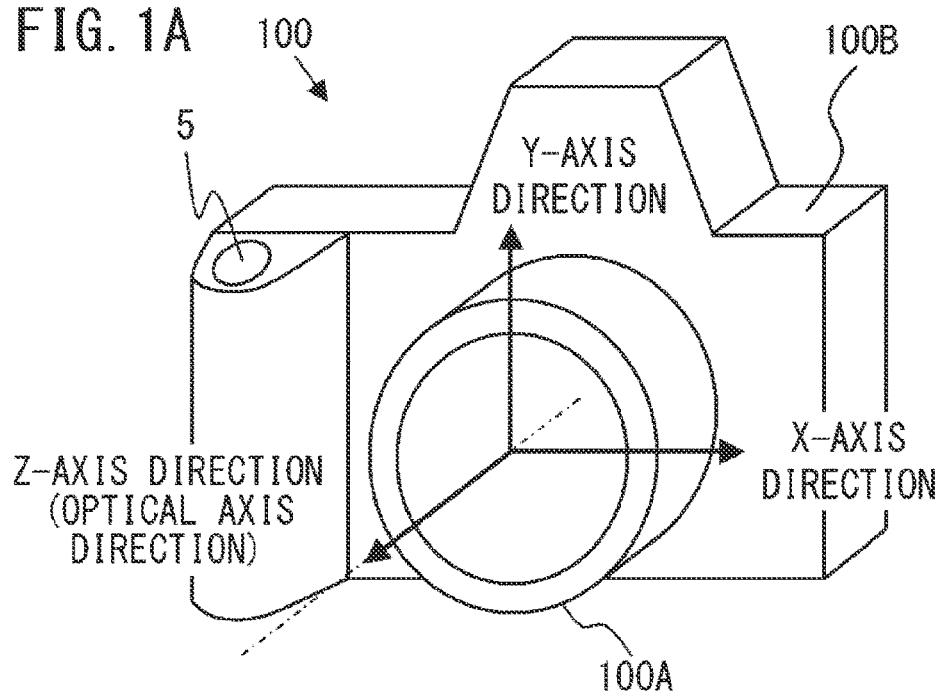
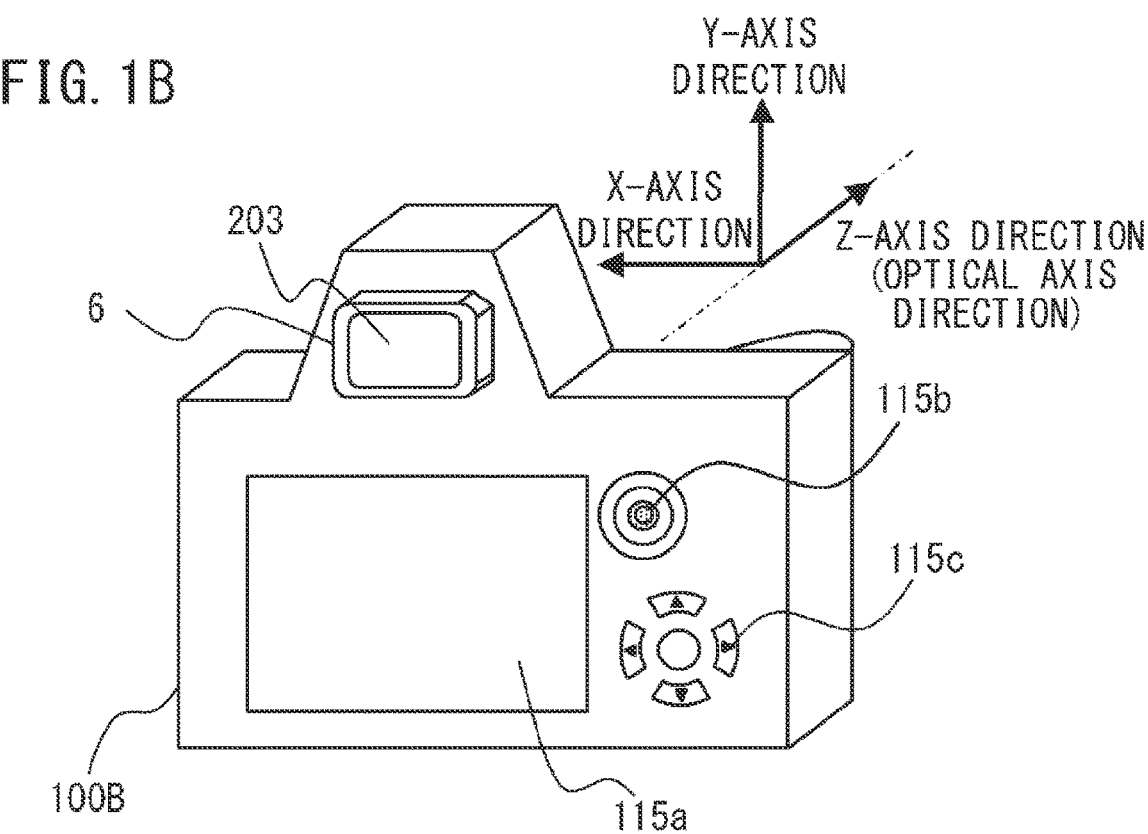

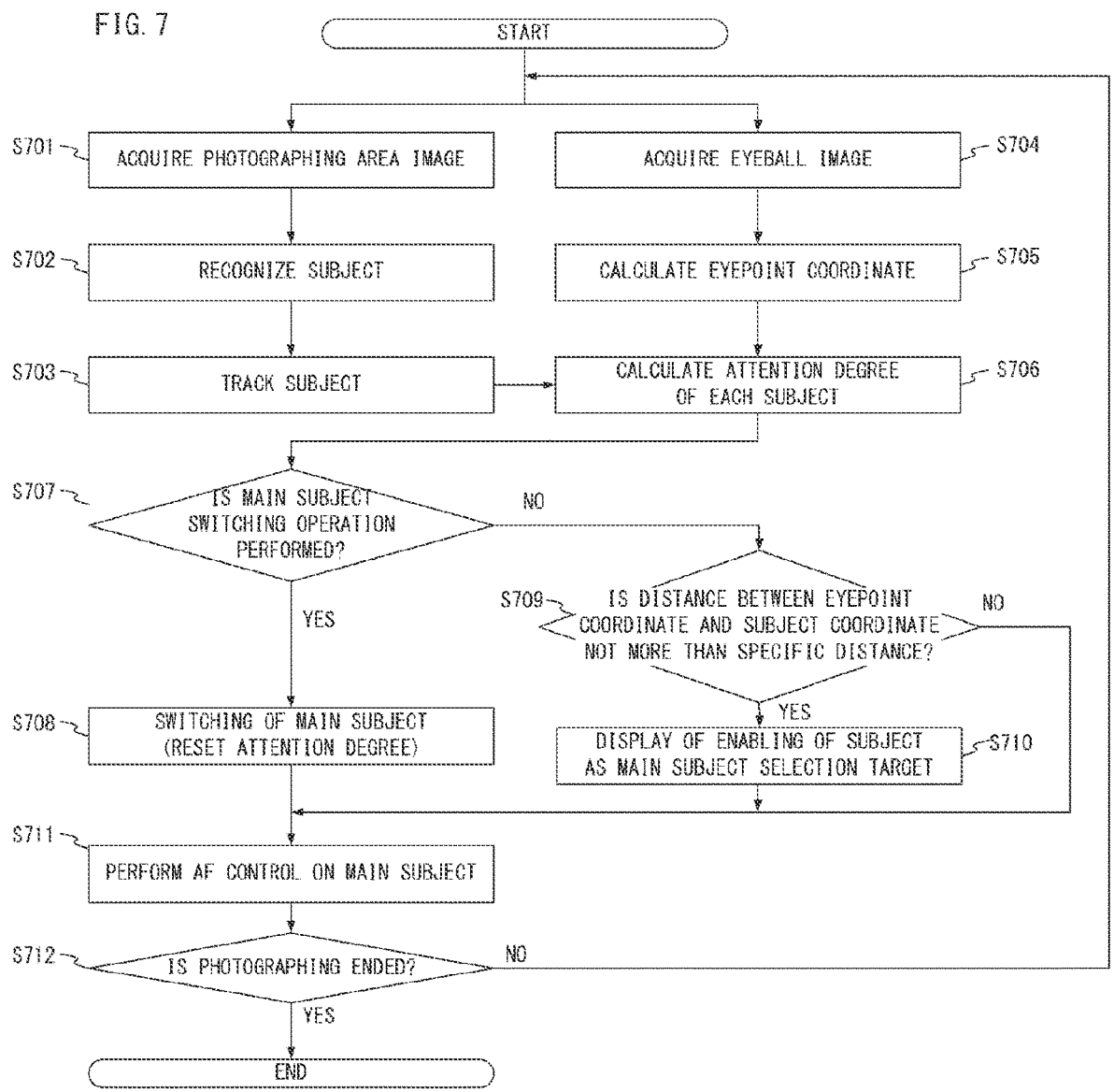

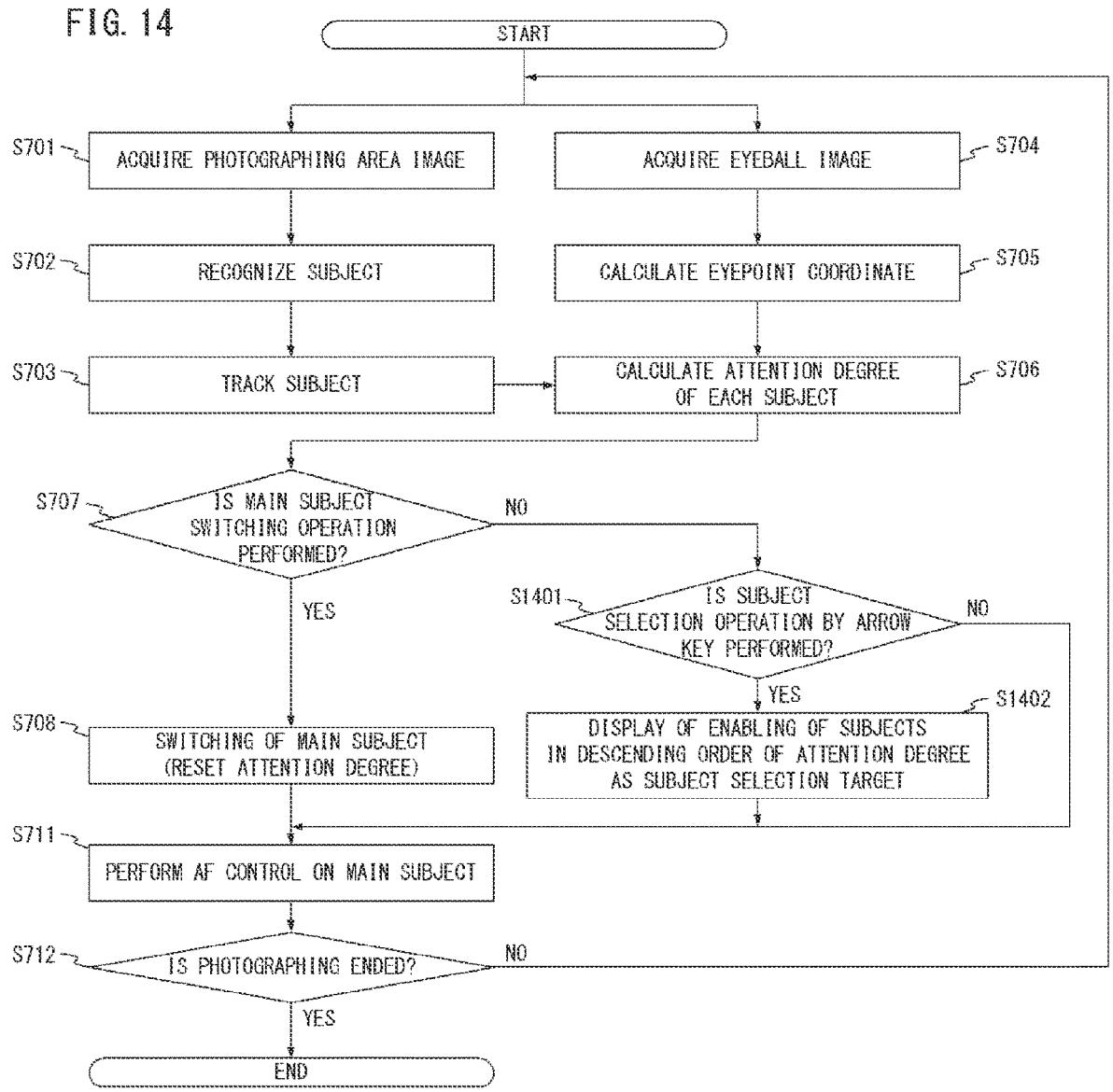

ELECTRONIC DEVICE, CONTROL METHOD, AND NON-TRANSITORY COMPUTER READABLE MEDIUM

BACKGROUND OF THE INVENTION

Field of the Invention

The technique of the present disclosure relates to an electronic device, a control method, and a non-transitory computer readable medium, and particularly relates to switching control of a subject in an electronic device.

Description of the Related Art

The number of mirrorless cameras is increasing in recent years, and there is used a technique which detects an eyepoint of a user who looks into a finder, displays an eyepoint pointer based on position information, and allows the user to designate any position even without operating an arrow key or a multi-controller manually.

Japanese Patent Application Publication No. 2021-67853 discloses a technique related to selection and switching of a main subject serving as a target on which autofocus (AF) control is performed by using position designation by a line of sight of a photographer who is a user.

In addition, Japanese Patent Application Publication No. 2021-108447 discloses a technique in which, in order to cope with a characteristic of an eyeball of a human which is referred to as involuntary eye movement during fixation in which an eyeball makes small movements even when a human gazes at a given point, an eyepoint pointer is displayed with a position which is averaged with time to alleviate an influence of the characteristic.

SUMMARY OF THE INVENTION

An object of the technique of the present disclosure is to provide an electronic device which allows an improvement in the responsiveness of a selection-switching operation of a main subject which uses detection of an eyepoint of a user.

According to an aspect of the present disclosure, it is provided an electronic device including a processor, and a memory storing a program which, when executed by the processor, causes the electronic device to detect an eyepoint of a user in an image which is captured by an imaging unit and is displayed in a display unit, track a plurality of subjects in the image, determine an attention degree of the user of each of the plurality of subjects based on the eyepoint of the user, and select any of the plurality of subjects as a main subject based on the attention degree of each of the plurality of subjects. In addition, according to an aspect of the present disclosure, it is provided an electronic device including a processor, and a memory storing a program which, when executed by the processor, causes the electronic device to display a plurality of subjects in an image which is captured by an imaging unit and is displayed in a display unit such that the plurality of subjects can be selected, and select any of the plurality of subjects displayed such that the plurality of subjects can be selected, wherein a subject at which a user has looked for a second time period which is longer than a first time period is more likely to be selected from among the plurality of subjects than a subject at which the user has looked for the first time period. In addition, according to an aspect of the present disclosure, it is provided an electronic device including a processor, and a memory storing a program which, when executed by the processor, causes the electronic device to display an image captured by an imaging unit in a display unit, detect an eyepoint of a user in the image displayed in the display unit, select any of a plurality of subjects as a main subject, and receive an operation by the user, wherein switching of the main subject selected by the received operation is allowed, and the program when executed by the processor causes the electronic device to display, among the plurality of subjects, instead of a first subject, a second subject at which a user has looked for a time period which is longer than a time period for which the user has looked at the first subject as a switching candidate for the main subject such that the second subject is distinguishable. In addition, according to an aspect of the present disclosure, it is provided an electronic device including a processor, and a memory storing a program which, when executed by the processor, causes the electronic device to detect an eyepoint of a user in an image displayed in a display unit, determine an attention degree of the user for each of a plurality of objects in the image based on the eyepoint of the user, and select the object based on the attention degree of each of the plurality of objects.

According to an aspect of the present disclosure, it is provided a control method of an electronic device, the method including a detection step of detecting an eyepoint of a user in an image which is captured by an imaging unit and is displayed in a display unit, a tracking step of tracking a plurality of subjects in the image, a determination step of determining an attention degree of the user of each of the plurality of subjects based on the eyepoint of the user, and a selection step of selecting any of the plurality of subjects as a main subject, wherein the main subject is selected based on the attention degree of each of the plurality of subjects in the selection step.

Further features of the present invention will become apparent from the following description of exemplary embodiments with reference to the attached drawings.

BRIEF DESCRIPTION OF THE DRAWINGS

FIGS. 1A and 1B are external views of a digital camera according to an embodiment;

FIG. 7 is a flowchart showing switching control processing of a main subject of a first embodiment;

FIG. 14 is a flowchart showing the switching control processing of the main subject of a fourth embodiment.

DESCRIPTION OF THE EMBODIMENTS

Figure 2:
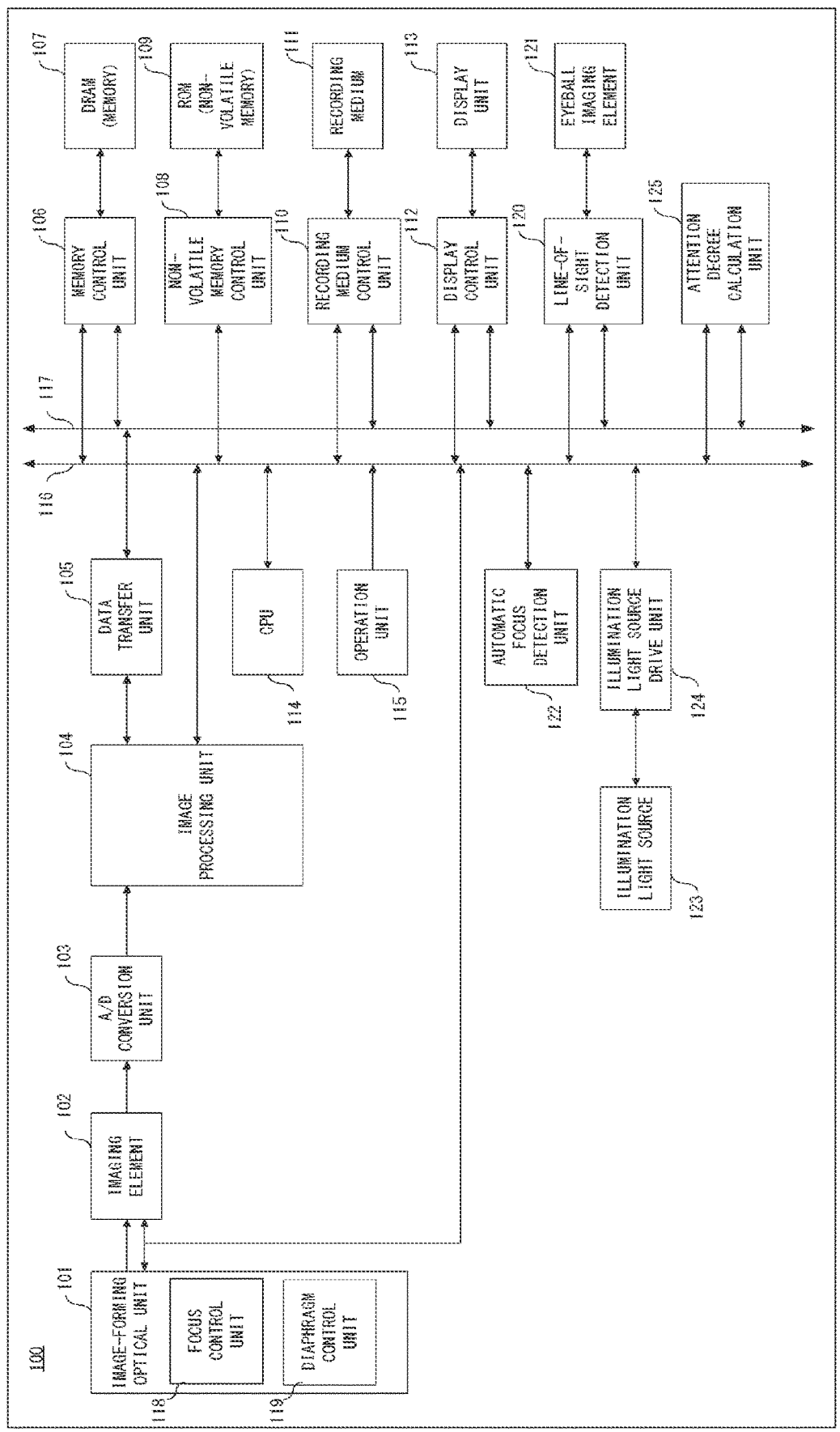
FIG. 2 is a block diagram showing a configuration of the digital camera according to the embodiment.

Hereinbelow, embodiments of the present disclosure will be described by using the drawings. Note that the present disclosure is not limited to the following embodiments, and can be changed appropriately without departing from the gist thereof. In addition, in the drawings described below, components having the same function are designated by the same reference numerals and the description thereof will be omitted or simplified is some cases.

In the conventional art disclosed in Japanese Patent Application Publication No. 2021-67853 or Japanese Patent Application Publication No. 2021-108447, the position of the eyepoint pointer is averaged with time and the eyepoint pointer is displayed for alleviating the influence of the involuntary eye movement during fixation, and hence there is a possibility that responsiveness of position designation by the eyepoint may be spoiled.

As a result, in a selection-switching operation of a main subject which is a target on which autofocus (hereinafter referred to as AF) control which uses the position designation by the eyepoint is performed, there is a possibility that photographing opportunity may be lost due to delay of timing.

First Embodiment

FIGS. 1A and 1B show an outer appearance of a digital camera 100 which is an electronic device according to a first embodiment. The digital camera 100 is an example of an imaging apparatus which images a subject. FIG. 1A is a front perspective view, and FIG. 1B is a rear perspective view. As shown in FIG. 1A, the camera 100 has a photographing lens 100A and a casing 100B. In the casing 100B, a release button 5 which is an operation member for receiving an imaging operation from a user (photographer) is disposed. As shown in FIG. 1B, on a back surface of the camera casing 100B, an eyepiece window frame 6 and an eyepiece 203 (eyepiece optical system) for the user to look into a display unit 113 included in the camera casing 100B are disposed. The eyepiece window frame 6 surrounds the eyepiece 203, and protrudes to the outside (back surface side) of the camera casing 100B with respect to the eyepiece 203. Note that the eyepiece optical system may include a plurality of lenses. On the back surface of the camera casing 100B, an operation unit 115 constituted by operation members 115a, 115b, and 115c which receive various operations from the user is also disposed. For example, the operation member 115a is a touch panel which receives a touch operation, the operation member 115b is an operation lever which can be tilted in each direction, and the operation member 115c is a four-direction key which can be pushed in in each of four directions. The operation member 115a (touch panel) includes a display panel such as an liquid crystal panel, and has the function of displaying an image with the display panel.

FIG. 2 is a block diagram of the digital camera 100 which is an electronic device according to the first embodiment of the present invention. In FIG. 2, an image-forming optical unit 101 includes a plurality of lens groups including a focus lens and a vibration isolation lens, and a diaphragm. When photographing is performed, the image-forming optical unit 101 performs focus adjustment with a focus control unit 118, and exposure adjustment and camera shake correction with a diaphragm control unit 119, and forms an optical image on an imaging element 102. The imaging element 102 has a photoelectric conversion function of converting the optical image to an electric signal (analog image signal). The imaging element 102 is constituted by, e.g., a CCD (Charged Coupled Device) or a CMOS (Complementary Metal-Oxide Semiconductor) sensor. In addition, the imaging element 102 includes dedicated pixels and a plurality of independent photodiodes in each pixel for imaging surface phase difference AF. An A/D conversion unit 103 converts the analog image signal from the imaging element 102 to a digital image signal. Image data after the conversion is input to an image processing unit 104 in the subsequent stage.

A bus 116 is a system bus for transmitting a control signal of each block mainly from a CPU 114 or the like, and a bus 117 is a data bus for transferring mainly image data. The CPU 114 is constituted by a microcomputer or the like which is in charge of control of the entire digital camera 100, and issues an operation instruction to each functional block and executes various control processing steps. In addition, the CPU 114 performs arithmetic calculation required when the various control processing steps are performed. The CPU 114 controls the image processing unit 104, a data transfer unit 105, a memory control unit 106, a non-volatile memory control unit 108, a recording medium control unit 110, a display control unit 112, an operation unit 115, and the imaging element 102 via the system bus 116. The CPU 114 executes a program recorded in a ROM 109, and thereby implements each processing of a control method of the digital camera described below. Further, the CPU 114 performs information acquisition of the lens of the image-forming optical unit 101, diaphragm control, and a focal length.

The data transfer unit 105 is constituted by a plurality of DMACs (Direct Memory Access Controller) which perform data transfer. A DRAM (memory) 107 is a memory which stores data, and has storage capacity which is sufficient to store data such as a predetermined number of still images, a movie of predetermined time, and sound, constants for the operation of the CPU 114, and a program. The memory control unit 106 performs data write and data read in and from the DRAM 107 in response to an instruction from the CPU 114 or the data transfer unit 105.

The non-volatile memory control unit 108 performs data write and data read in and from a ROM (non-volatile memory) 109 in response to an instruction from the CPU 114. The ROM 109 is an electrically erasable-recordable memory, and an EEPROM or the like is used. In the ROM 109, constants for the operation of the CPU 114 and a program are stored.

The image processing unit 104 is constituted by various image processing units and a buffer memory, and performs processing such as magnification chromatic aberration correction, development processing, noise reduction processing, geometric deformation, and resizing such as enlargement and reduction. In addition, the image processing unit 104 includes an imaging correction unit or the like which performs processing of detecting, recognizing, and tracking a subject from a developed or processed image, and properly performs pixel correction, black level correction, shading correction, and flaw correction on image data which is converted by the A/D conversion unit 103.

A recording medium 111 is a recording medium such as an SD card, and is controlled by the recording medium control unit 110 and performs recording of image data and read of recorded data.

The display unit 113 is constituted by a liquid crystal display and an electronic viewfinder, and is controlled by the display control unit 112 and displays various pieces of image data transferred from the image processing unit 104 and a menu screen. In addition, the display unit 113 processes image data input from the A/D conversion unit 103 in real time and displays the image data before photographing of a still image and at the time of movie shooting.

The operation unit 115 serving as an operation unit includes a switch, a button, and a touch panel operated by a user, and is used in operations such as ON/OFF of a power supply and ON/OFF of a shutter. An eyeball imaging element 121 forms an optical image of an eyeball of the user who looks into a viewfinder, and outputs image data to a line-of-sight detection unit 120. The line-of-sight detection unit 120 detects a line-of-sight direction of the user based on an image input from the eyeball imaging element 121. The detail of a line-of-sight detection operation will be described later.

An illumination light source 123 and an illumination light source drive unit 124 are an infrared light source for line-of-sight detection and a drive unit which controls the infrared light source. Infrared light is emitted toward the eyeball of the user, and its reflection image is formed on the eyeball imaging element 120.

An attention degree detection unit 125 calculates an interest degree of the user of each subject based on line-of-sight data of the user detected by the line-of-sight detection unit 120 and subject area information recognized by the image processing unit 104, and outputs the interest degree as an attention degree.

An automatic focus detection unit 122 calculates a lens drive amount to a focused area which is output by the line-of-sight detection unit 120 or the image processing unit 104, and instructs the focus control unit 118 to perform drove control of the focus lens. The calculation of the lens drive amount is performed by, e.g., an imaging surface phase difference method or the like based on an image for focus detection acquired by the imaging element 102.

Figure 3:
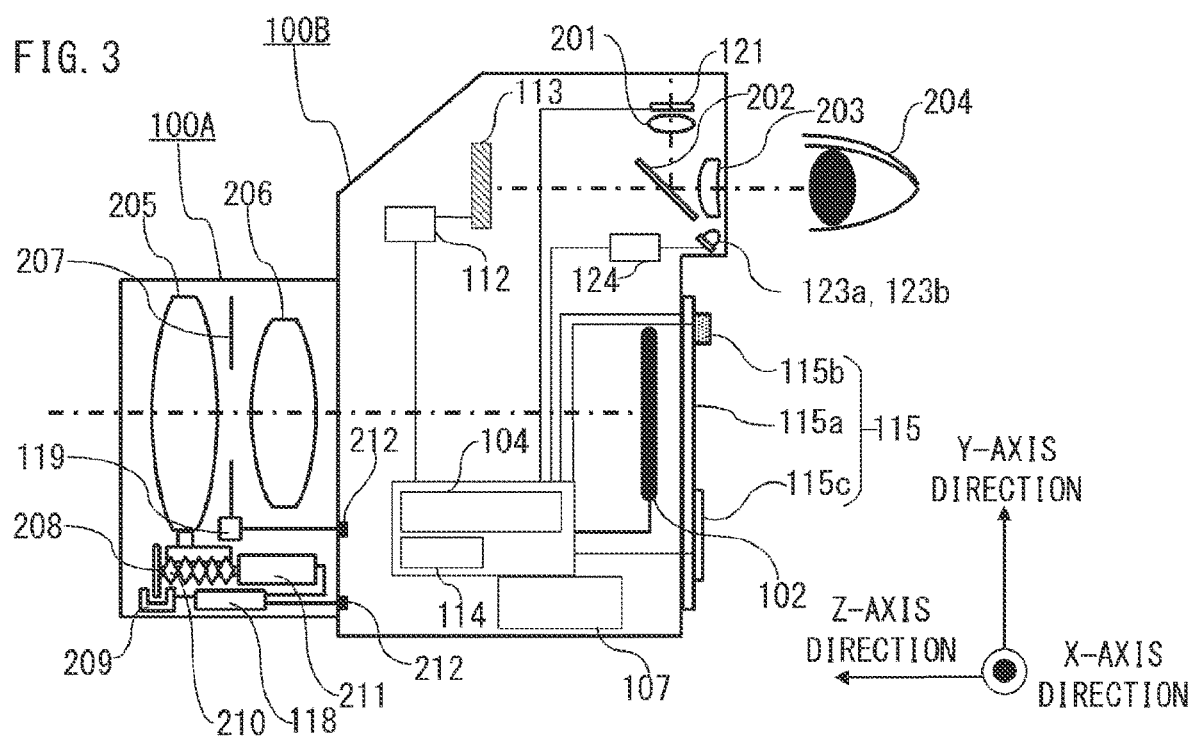
FIG. 3 is a cross-sectional view of a casing of the digital camera according to the embodiment.

FIG. 3 is a cross-sectional view of a casing of the digital camera 100 according to the first embodiment, and is an explanatory view schematically showing its configuration. In FIGS. 1 and 2, corresponding portions are designated by the same numbers.

In FIG. 3, the photographing lens 100A is a lens for an interchangeable-lens camera. In the present embodiment, for the sake of convenience, the inside of the photographing lens 100A is constituted by two lenses 205 and 206, but the inside thereof may also be constituted by a larger number of lenses actually. The casing 100B is a camera main body, and the imaging element 102 is disposed on a planned image forming plane of the photographing lens 100A of the digital camera 100. The eyepiece 203 is a lens for observing a subject image displayed in the display unit 113.

In the casing 100B, light sources 123a and 123b constituted by infrared light-emitting diodes for irradiating an eyeball 204 of the user for detecting the line-of-sight direction from a relationship between reflection images by corneal reflection of the light sources and a pupil are disposed around the eyepiece 203. An image of an irradiated eyeball and images formed by corneal reflection of the light sources 123a and 123b pass through the eyepiece 203, are reflected by an optical divider 202, and are formed on the eyeball imaging element 121 in which rows of photo-electric elements such as CCDs are two-dimensionally arranged by a light receiving lens 201. The light receiving lens 201 is disposed such that the pupil of the eyeball 204 of the user and the eyeball imaging element 121 have a conjugate image forming relationship. The line-of-sight direction is detected by a predetermined algorithm described later from a positional relationship between the eyeball of which the image is formed on the eyeball imaging element 121 and the images by the corneal reflection of the light sources 123a and 123b.

In the photographing lens 100A, a diaphragm 207, a diaphragm control unit 119, a lens drive member 210 constituted by a drive gear and the like, and a lens drive motor 211 are provided. In addition, in the photographing lens 100A, a photocoupler 209 which detects rotation of a pulse plate 208 which moves in synchronization with the lens drive member 210 and notifies the focus control unit 118 of the rotation thereof is provided. The focus control unit 118 drives the lens drive motor 211 by a predetermined amount based on information from the photocoupler 209 and information on the lens drive amount from a camera side, and moves the focus lens 205 to a focal point position. In addition, the photographing lens 100A has mount contacts 212 serving as interfaces between the camera and the lens.

Figure 4:
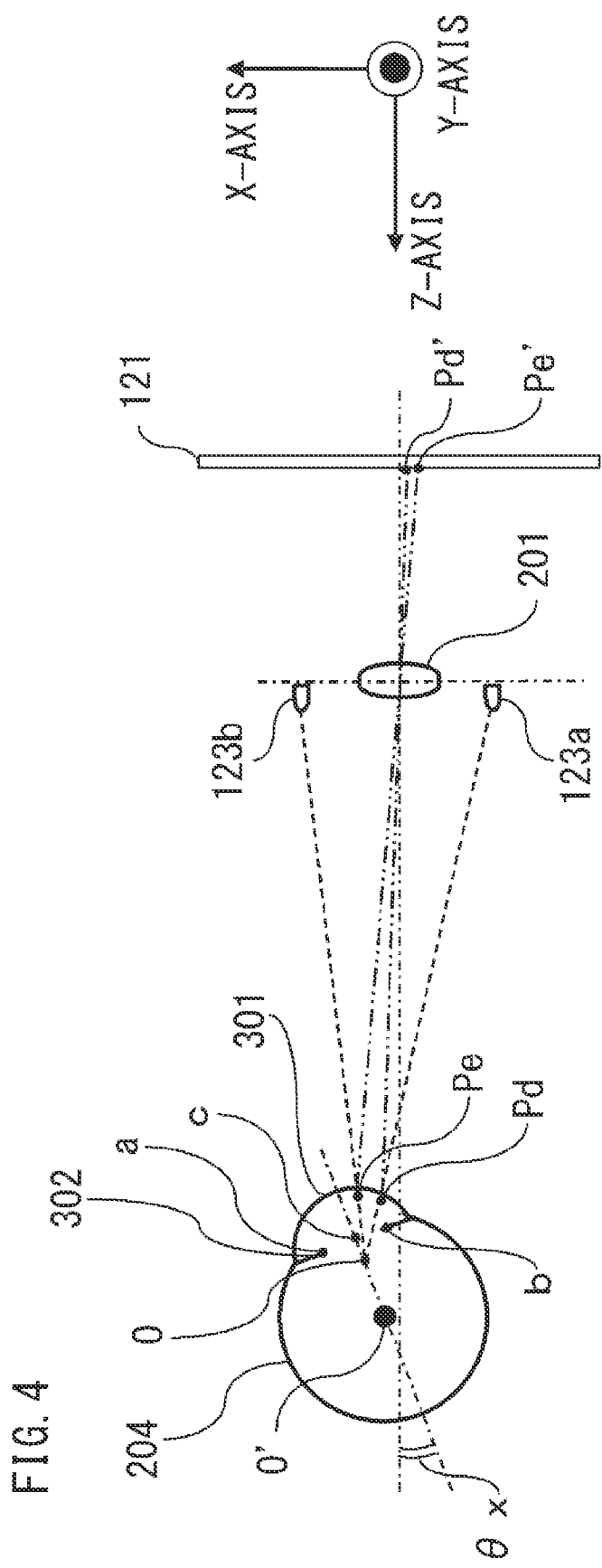
FIG. 4 is a diagrammatic illustration for explaining principles of a line-of-sight detection method.

FIG. 4 is an explanatory view showing principles of the line-of-sight detection method, and is a diagrammatic illustration of an optical system for performing line-of-sight detection. In FIG. 3, the light sources 123a and 123b are light-emitting diodes or the like which emit infrared light to which the user is insensitive, and the light sources 123a and 123b are disposed so as to be substantially symmetrical with respect to the optical axis of the light receiving lens 201 and irradiate the eyeball 204 of an observer. Part of illumination light reflected by the eyeball 204 is condensed on the eyeball imaging element 121 by the light receiving lens 201.

Figure 5:
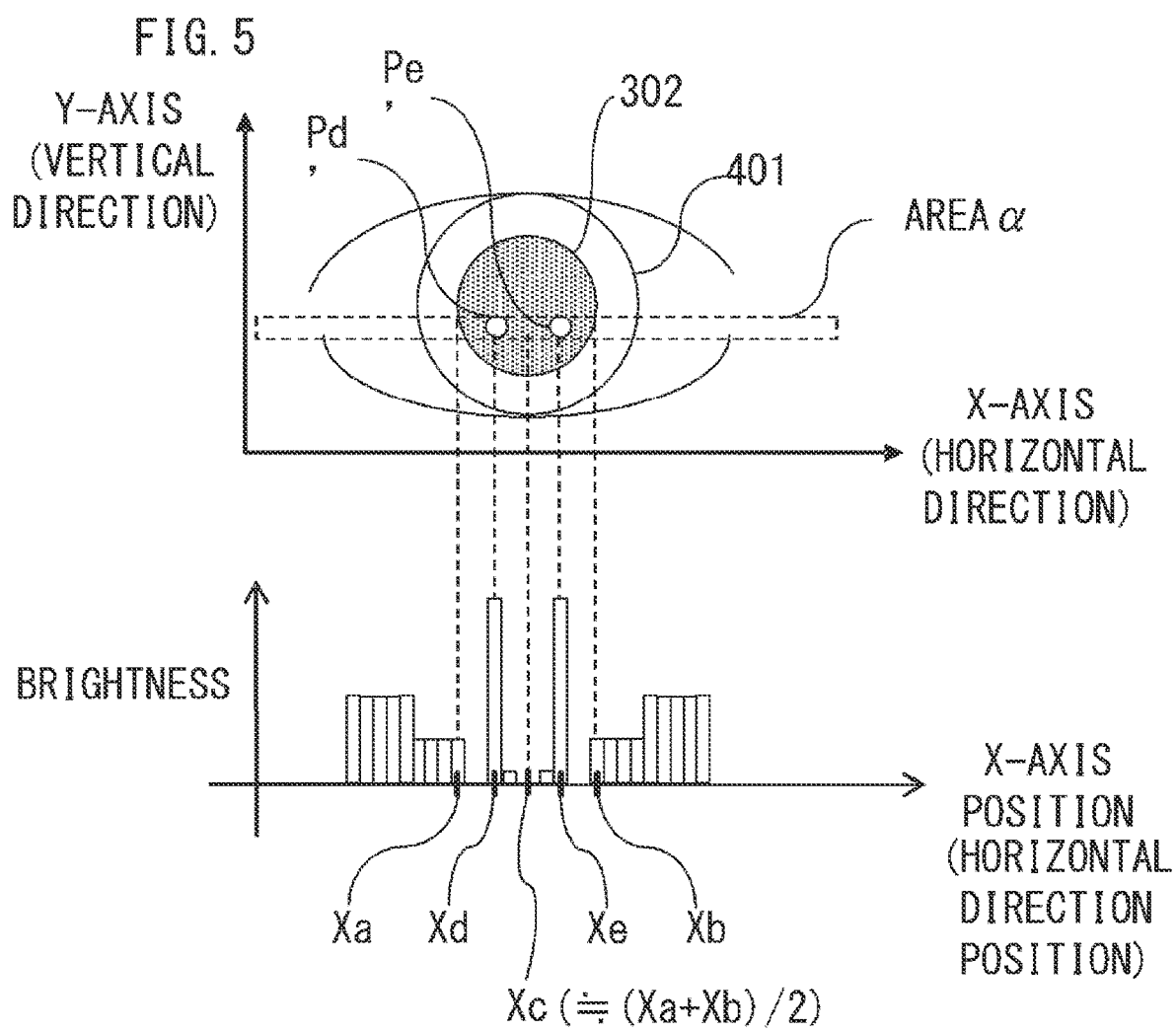
FIG. 5 includes a schematic view of an eyeball image projected onto an imaging element and a view of output intensity in the imaging element.
Figure 6:
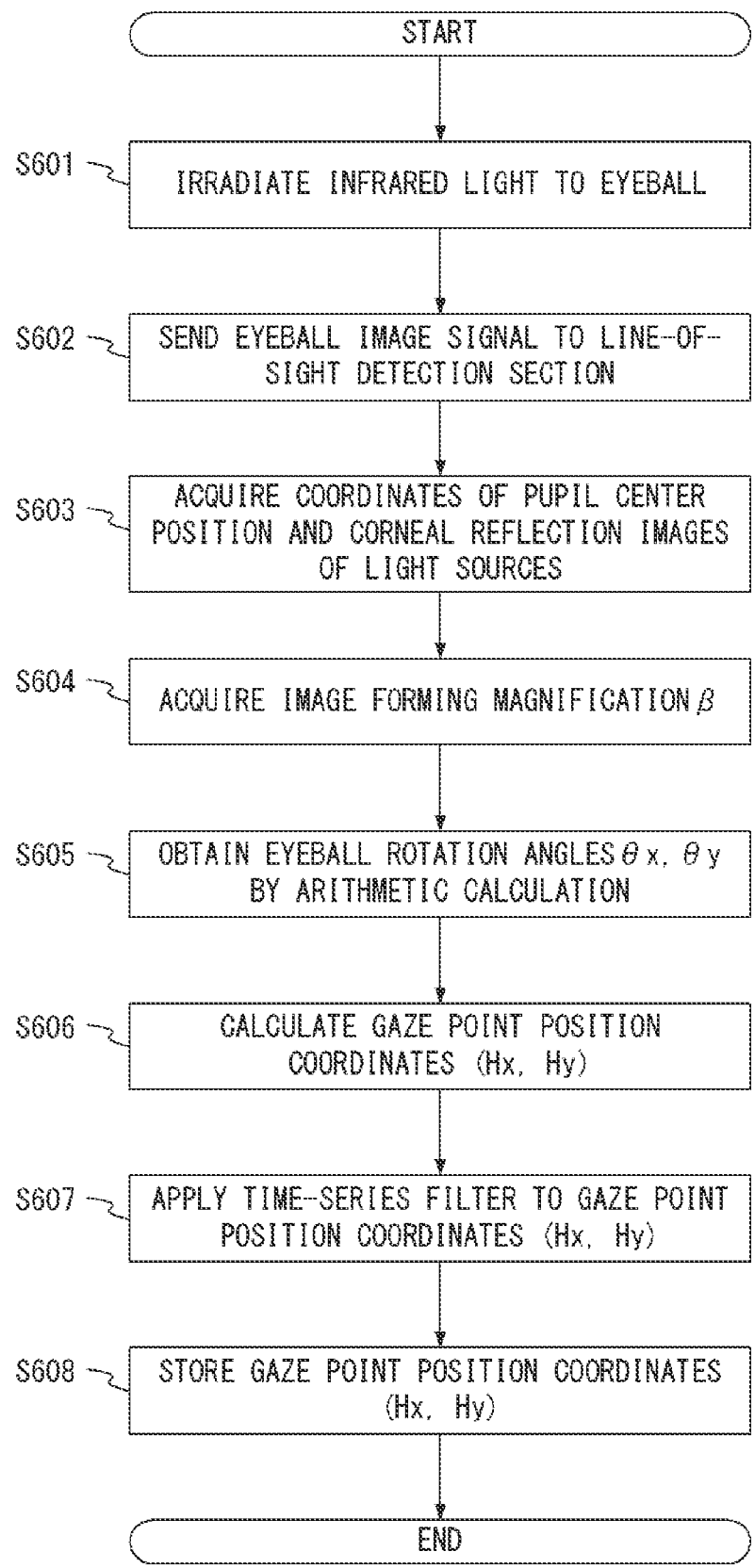
FIG. 6 is a flowchart showing line-of-sight detection processing in the embodiment.

FIG. 5 shows a schematic view of an eyeball image projected onto the eyeball imaging element 121 and a view of output intensity of a CCD in the eyeball imaging element 121. In the drawing, an upper view is the schematic view of the eyeball image, and a lower view is the view of output intensity of the CCD. FIG. 6 shows a flowchart of line-of-sight detection processing executed by the CPU 114 of the digital camera 100 in the present embodiment. Hereinbelow, by using FIGS. 4 to 6, the line-of-sight detection processing in the present embodiment will be described.

(Explanation of Line-of-sight Detection Operation) When a line-of-sight detection routine is started, in Step S601, the CPU 114 emits infrared light toward the eyeball 204 of the user with the light sources 123a and 123b. The eyeball image of the user irradiated by the infrared light is formed on the eyeball imaging element 121 through the light receiving lens 201 and is subjected to photoelectric conversion by the eyeball imaging element 121, and it becomes possible to process the eyeball image as an electric signal.

In Step S602, the CPU 114 sends an eyeball image signal obtained from the eyeball imaging element 121 to the line-of-sight detection unit 120.

In Step S603, the CPU 114 determines coordinates of points corresponding to corneal reflection images Pd and Pe of the light sources 123a and 123b shown in FIG. 4 and a pupil center c from information on the eyeball image signal obtained in Step S602. A cornea 301 of the eyeball 204 of the user is irradiated with the infrared light emitted from the light sources 123a and 123b. At this point, the corneal reflection images Pd and Pe formed by part of the infrared light reflected on the surface of the cornea 301 are condensed by the light receiving lens 201, and are formed on the eyeball imaging element 121 (points Pd' and Pe' in the drawing). Similarly, images of light fluxes from ends a and b of a pupil 302 are also formed on the eyeball imaging element 121.

FIG. 5 shows an image example (an upper view in the drawing) of reflection images obtained from the eyeball imaging element 121 and an example (a lower view in the drawing) of brightness information obtained from the eyeball imaging element 121 in an area a in the image example. As shown in the drawing, it is assumed that a horizontal direction corresponds to an X-axis, and a vertical direction corresponds to a Y-axis. It is assumed that, at this point, coordinates in an X-axis direction (horizontal direction) of the images Pd' and Pe' obtained by formation of the corneal reflection images of the light sources 123a and 123b are Xd and Xe. In addition, it is assumed that coordinates in the X-axis direction of images a' and b' obtained by image formation of the light fluxes from the ends a and b of the pupil 302 are Xa and Xb. In the example of the brightness information in FIG. 5, at each of positions Xd and Xe corresponding to the images Pd' and Pe' obtained by the formation of the corneal reflection images of the light sources 123a and 123b, brightness of an extremely high level is obtained. In an area from the coordinate Xa to the coordinate Xb which corresponds to an area of the pupil 302, brightness of an extremely low level is obtained except the positions Xd and Xe described above. In contrast to this, in an area having a value of the X coordinate lower than Xa and an area having a value of the X coordinate higher than Xb which correspond to an area of an iris 401 outside the pupil 302, a value of a brightness level between the two types of the brightness levels described above is obtained. Subsequently, it is possible to obtain the X coordinates Xd and Xe of the images Pd' and Pe' obtained by the formation of the corneal reflection images of the light sources 123a and 123b, and the X coordinates Xa and Xb of the images a' and b' of pupil ends from fluctuation information of the brightness level of the above X coordinate positions. In addition, in the case where a rotation angle θx of the optical axis of the eyeball 204 with respect to the optical axis of the light receiving lens 201 is small, a coordinate Xc of a location (indicated by c') corresponding to the pupil center c which is formed into an image on the eyeball imaging element 121 can be expressed as Xc≈(Xa+Xb)/2. From the foregoing, it is possible to estimate the X coordinate of c' corresponding to the pupil center which is formed into the image on the eyeball imaging element 121 and the coordinates of the corneal reflection images Pd' and Pe' of the light sources 123a and 123b.

Next, in Step S604, the CPU 114 calculates an image forming magnification β of the eyeball image. The image forming magnification β is a magnification determined according to the position of the eyeball 204 with respect to the light receiving lens 201 and, actually, the image forming magnification β can be determined as a function of an interval (Xd-Xe) between the corneal reflection images Pd' and Pe'.

In addition, in Step S605, the X coordinate of the middle point between the corneal reflection images Pd and Pe substantially matches the X coordinate of the center of curvature O of the cornea 301. Accordingly, when it is assumed that a standard distance between the center of curvature O of the cornea 301 and the center c of the pupil 302 is Oc, the rotation angle θx of the optical axis of the eyeball 204 in a Z-X plane can be determined by the following formula (1).

$$\beta \times Oc \times \sin \theta x \approx \{(Xd+Xe)/2\} - Xc \quad (1)$$

In addition, each of FIGS. 4 and 5 shows an example in which the rotation angle θx in the case where the eyeball of the user rotates in a plane perpendicular to the Y-axis is calculated, and a calculation method of a rotation angle θy in the case where the eyeball of the user rotates in a plane perpendicular to the X-axis is similar to the above calculation method.

When the rotation angles θx and θy of the optical axis of the eyeball 204 of the user are calculated, in Step S506, the CPU 114 determines the position of the line of sight of the user (the position of a point at which the user gazes. Hereinafter referred to as a gaze point) on the display unit 113 by using θx and θy. The gaze point position can be determined as coordinates (Hx, Hy) corresponding to the center c of the pupil 302 on the display unit 113 by the following formulas (2) and (3).

$$Hx = m \times (Ax \times \theta x + Bx) \quad (2)$$

$$Hy = m \times (Ay \times \theta y + By) \quad (3)$$

Herein, a coefficient m is a constant determined by the configuration of a finder optical system of a camera and is a conversion coefficient for converting the rotation angles θx and θy to position coordinates corresponding to the center c of the pupil 302 on the display unit 113, and is determined in advance and is stored in the memory 107. In addition, Ax, Bx, Ay, and By are line-of-sight correction coefficients for correcting an individual difference of the line of sight of the user, are acquired by performing calibration work, and are stored in the memory 107 before the line-of-sight detection routine in FIG. 6 is started.

As described above, after the coordinates (Hx, Hy) of the center c of the pupil 302 on the display unit 113 are calculated, the CPU 114 applies a time-series filter which averages a predetermined time period to the calculated coordinates in order to alleviate an influence of coordinate fluctuation by involuntary eye movement during fixation in Step S607. Subsequently, in Step S608, the CPU 114 stores the above coordinates in the memory 107, and ends the line-of-sight detection routine. In addition, the CPU 114 measures a time period in which the position of the line of sight stays in a given area, and stores a staying time period of the position of the line of sight in each area in the memory 107 as a gaze time period.

Note that, while the above-described processing is an example of a method of acquiring gaze point coordinates on a display element which uses the corneal reflection images of the light sources 123a and 123b, any method can be applied to the present embodiment as long as the eyeball rotation angle can be acquired from the captured eyeball image.

Figure 8A:
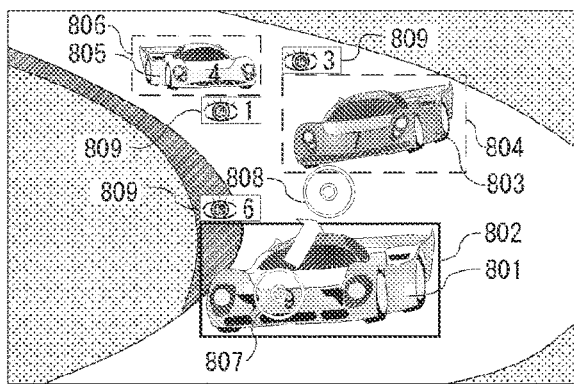
FIGS. 8A to 8C are schematic views showing the switching control processing of the main subject of the first embodiment.
Figure 8B:
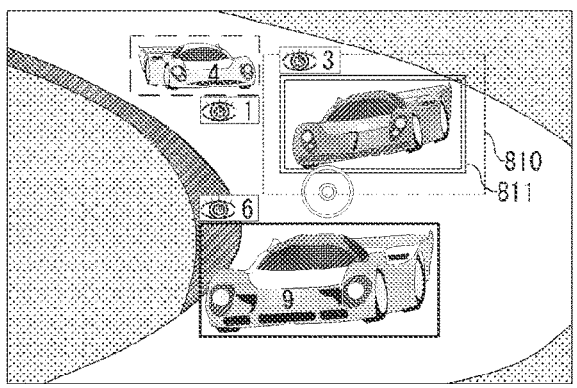
Figure 8C:
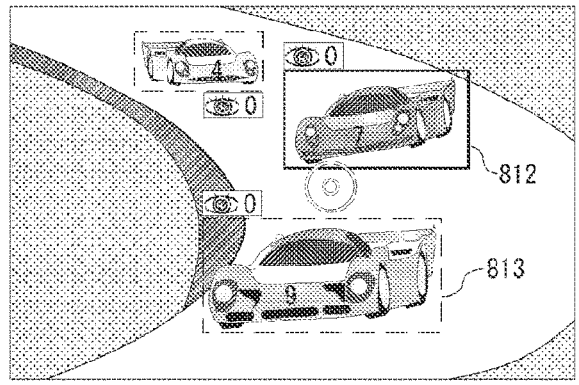
Figure 9A:
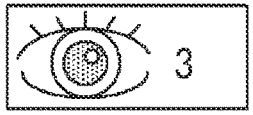
FIGS. 9A to 9C are schematic views showing display examples of an attention degree in the embodiment.
Figure 9B:
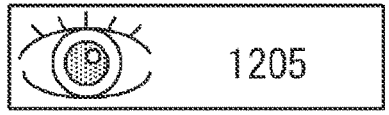
Figure 9C:
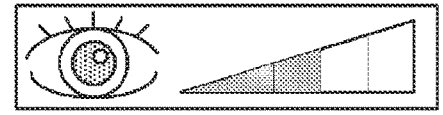

FIG. 7 shows a flowchart of selection-switching control processing of a main subject executed by the digital camera 100 according to the present embodiment, and FIGS. 8A to 8C are views schematically explaining the selection-switching control processing of the main subject of the present embodiment. In addition, FIGS. 9A to 9C are views showing display examples of the attention degree of the user. Hereinafter, processing executed in FIG. 7 will be described with reference to FIG. 7, FIGS. 8A to 8C, and FIGS. 9A to 9C.

When photographing by the user is started, the CPU 114 starts the selection-switching control processing of the main subject, and two processing steps in Step S701 and Step S704 are executed in parallel with each other.

In Step S701, the imaging element 102 acquires an image of a photographing area including the main subject, and outputs the acquired image to the image processing unit 104 via the A/D conversion unit 103. When the acquisition and the output of the image of the photographing area are completed in Step S701, the processing proceeds to Step S702.

In Step S702, the image processing unit 104 performs recognition of a subject in a live-view image generated to be displayed in the display unit 113 in a finder. Subject recognition processing is processing in which a specific subject area is estimated by using, e.g., deep learning, i.e., a multi-layer neural network including a learned convolution layer. In addition, the subject recognition processing may also be processing in which a conspicuous area in an image is calculated from a texture, a color, and a histogram without using the deep learning, and the calculated area is estimated as the subject area. In the case where a plurality of subjects are present in the image, a plurality of estimation results of the subject area are output. In the estimation result of the subject area, results corresponding to all subjects in an initial frame and, in a subsequent frame, a result corresponding to a subject which is not a tracking target and has newly appeared in the frame by frame-in are output. For example, as shown in FIG. 8A, in the case where subjects 801, 803, and 805 are present in a live-view image, their subject areas 802, 804, and 806 are output as estimation results. When the subject area is estimated by the subject recognition processing in Step S702, the processing proceeds to Step S703.

In Step S703, the image processing unit 104 functions as a tracking unit, performs tracking of a plurality of subjects output in Step S702, and outputs a subject tracking result to the CPU 114. In subject tracking processing, an area in a current frame which corresponds to the subject area of the tracking target in a previous frame is estimated by using, e.g., deep learning. More specifically, the subject tracking processing has the function of extracting feature points of the subject area and feature amounts included in the feature points, and the function of associating the extracted feature points with frames. That is, from the feature point in the current frame which is associated with the feature point of the subject area of the tracking target in the previous frame, the position and the size of the subject area of the tracking target in the current frame are estimated. In addition, the subject tracking processing may also be processing in which the subject area in the current frame corresponding to the subject area of the tracking target in the previous frame is estimated from a texture, a color, and a histogram without using deep learning. The subject tracking result results in a loss determination in the case where the subject area of the tracking target in the previous frame is not found in the current frame due to frame-out of the subject or the like. In addition, with regard to a subject which is newly recognized in the current frame in Step S702, the estimation result of the subject recognition processing is output as the subject tracking result without altering the estimation result.

For example, as shown in FIG. 8A, in the case where the subjects 801, 803, and 805 are present in the live-view image, the corresponding subject areas 802, 804, and 806 in the immediately preceding frame are estimated, and it becomes possible to continuously recognize the subjects as the same subjects in a plurality of frames. When the individual subject areas in the current frame are estimated by the subject tracking processing in Step S703, its result is output also to the attention degree calculation unit 125, and the processing performs completion of Step S705 and queuing and proceeds to Step S706.

On the other hand, in Step S704, the eyeball imaging element 121 acquires the image of the eyeball of the user irradiated by the illumination light source 123, and outputs image data to the line-of-sight detection unit 120. When the eyeball image of the user is acquired in Step S704, the processing proceeds to Step S705.

In Step S705, the line-of-sight detection unit 120 functions as a detection unit, and detects the line of sight of the user with the above-described line-of-sight detection routine. Subsequently, the line-of-sight detection unit 120 calculates an eyepoint coordinate in the live-view image displayed in the display unit 113 in the finder, and displays an eyepoint pointer (e.g., 808 in FIG. 8A). In addition, the line-of-sight detection unit 120 outputs the eyepoint coordinate to the CPU 114 and the attention degree calculation unit 125. When the eyepoint coordinate of the user is calculated in Step S705, the processing performs completion of Step S703 and queuing, and proceeds to Step S706.

In Step S706, the attention degree calculation unit 125 functions as a determination unit, and determines the attention degree of the user for each of a plurality of subjects based on the eyepoint of the user. Specifically, the attention degree calculation unit 125 calculates the attention degree of the user of each subject from individual subject area information in the current frame output by the image processing unit 104 in Step S703, and the eyepoint coordinate output by the line-of-sight detection unit 120 in Step S705. The attention degree of each subject is a degree of inclusion of the detected eyepoint of the user in the area of a tracked subject. An example of the degree of inclusion of the eyepoint of the user includes a period in which the eyepoint coordinate stays in the subject area (for example, the number of times of sampling of the eyepoint coordinate calculation, the number of corresponding display frames, a count value of the number of times of staying for a predetermined time period, or a ratio to a total value of all subjects). With regard to the subject which has been determined to be lost in Step S703, the attention degree thereof is cancelled. The calculated attention degree of each subject is output to the CPU 114. In addition, attention degree information is displayed so as to be superimposed on the live-view image (e.g., 809 in FIG. 8A) displayed in the display unit 113 in the finder according to setting.

With regard to the display of the attention degree information, the attention degree information may be divided into several levels (e.g., five levels) with preset thresholds and is displayed as numerical values as shown in FIG. 9A, the attention degree information may also be displayed as numerical values without altering the attention degree information as shown in FIG. 9B, and level values may be displayed with a meter as shown in FIG. 9C. In addition, the attention degree information may also be displayed such that level values are expressed by using a color, a thickness, or a multiple line of frame display indicative of the subject area. Thus, in the display unit 113, it is possible to display the determined attention degrees of a plurality of subjects by using at least one of a numerical value, a diagram, and a color. When the attention degree of each subject is calculated in Step S706, the processing proceeds to Step S707.

In Step S707, the CPU 114 determines whether or not a switching determination operation of the main subject serving as an AF control target has been performed by operating the operation unit 115 serving as an operation unit by the user. Herein, an example of the switching determination operation of the main subject includes an operation in which the main subject after switching is determined by using at least one of the touch panel 115a, the operation lever 115b, and the four-direction key 115c. In the case where the switching determination operation of the main subject has been performed (S707: YES), the processing proceeds to Step S708 and, in the case where the switching determination operation of the main subject is not performed (S707: NO), the processing proceeds to Step S709.

In Step S709, the CPU 114 determines whether or not a distance between the eyepoint coordinate and the coordinate of the subject (e.g., a center coordinate of the subject area) is not more than a specific threshold distance. As shown in FIG. 8A, when the eyepoint pointer indicative of the eyepoint of the user moves from the position of 807 to the position of 808, the eyepoint coordinate is included in an area 810 indicating that the area 810 is within the specific threshold distance from the subject 803 in FIG. 8B. With this, it is determined that the distance between the eyepoint coordinate and the subject coordinate is not more than the specific threshold distance. The size of the area 810 indicating that the area 810 is within the specific threshold distance from the subject 803 is calculated so as to be equal to the size of the subject area 804 when the attention degree of the subject 803 is, e.g., zero and is calculated so as to be larger as the attention degree is higher. In addition, for the convenience of description, the area 810 is shown in the drawing so as to be displayed in the display unit 113, but it is assumed that the area 810 is not displayed in the display unit 113 in the finder, and information related to the area 810 is internally held by the digital camera 100.

In addition, basically, in switching of the main subject, switching from the main subject to a subject other than the main subject is assumed to be performed, and hence, in Step S709, it is assumed that the attention degree of the main subject 801 is handled as zero. When it is determined that the distance between the eyepoint coordinate and the subject coordinate is not more than the specific distance in Step S709 (S709: YES), the processing proceeds to Step S710. When it is determined that the distance between the eyepoint coordinate and the subject coordinate is more than the specific distance (S709: NO), the processing proceeds to Step S711.

In Step S710, the CPU 114 functions as a selection unit, and brings a subject having the distance to the eyepoint coordinate which is not more than the specific distance into an enabled state (a selection state which allows the subject to be determined as the main subject) as a switching target of the main subject. Subsequently, the CPU 114 outputs a command to perform display for notifying the user of the state to the display control unit 112. The display control unit 112 functions as a display control unit according to the command from the CPU 114, and displays a plurality of subjects in the image such that the plurality of subjects can be selected. Specifically, an example of the display includes display of a double frame 811 which surrounds the subject as shown in FIG. 8B, and the display is different from a thick-line frame 802 of the main subject 801 serving as the current AF control target and a broken-line frame 806 indicative of the subject area of the subject other than the main subject. When display of enabling of the subject as the switching target of the main subject is performed in Step S710, the processing proceeds to Step S711.

On the other hand, in Step S708, the CPU 114 sets the subject selected when the switching determination operation of the main subject is performed by the user as the main subject, and resets the attention degrees of all subjects to initial values. In addition, the display of the attention degree information is reset to zero which is the initial value. When switching processing of the main subject is performed in Step S708, the processing proceeds to Step S711.

In Step S711, the CPU 114 instructs the automatic focus detection unit 122 to perform focus control on a main subject area (802 or 812), and the automatic focus detection unit 122 calculates a lens drive amount and instructs the focus control unit 118 to perform drive control of a focus lens. When the focus control of the main subject area is completed by the drive control of the focus lens of the focus control unit 118, the processing proceeds to Step S712.

In examples in FIGS. 8A to 8C, when the eyepoint pointer 808 indicative of the eyepoint position of the user moves into the area 810 in a state in which the subject 801 is set as the main subject, a notification that the subject 803 can be determined as the main subject (display of the frame 811) is provided. AF control is performed on the subject 801 until the user performs the determination operation for switching the main subject to the subject 803. Subsequently, when the user performs the determination operation for switching the main subject to the subject 803, as shown in FIG. 8C, the main subject is switched from the subject 801 to the subject 803, and the AF control is performed on the subject 803. In addition, with regard to the frame of the subject area, a broken-line frame 813 indicative of a subject other than the main subject and a thick-line frame 812 indicative of the main subject are displayed in the display unit 113.

Subsequently, in Step S712, the CPU 114 determines whether or not photographing by the user is ended. In the case where the power supply of the digital camera 100 is tuned OFF by the user or an AF operation is released (S712: YES), the CPU 114 ends the selection-switching control processing of the main subject. In addition, in the case where the photographing is continued (S712: NO), the CPU 114 returns the processing to Steps S701 and S704 and repeats the processing in Steps S701 to S712 described above.

As described thus far, a range in which the subject is selected as the subject candidate for the main subject based on the attention degree of each subject is enlarged. Subsequently, among a plurality of subjects, on a subject in the image which has the higher attention degree, i.e., a subject having attracted more eyepoints of the user, display having a priority higher than those of the other subjects is performed. Among a plurality of subjects, the display control unit 120 displays, instead of a first subject, a second subject at which the user has looked for a time period which is longer than a time period for which the user has looked at the first subject as the switching candidate for the main subject such that the second subject is distinguishable. Accordingly, among a plurality of the subjects, the subject at which the user has looked for a second time period which is longer than a first time period becomes more likely to be selected than the subject at which the user has looked for the first time period. In addition, even in a state in which the eyepoint pointer is not completely on the subject area, it becomes possible to select the subject as the switching target of the main subject. With this, in the case where the switching operation of the main subject is performed by position designation by the line of sight of the user and the determination operation by a button operation, it becomes possible to improve responsiveness of the selection-switching operation of the main subject and achieve a reduction in the loss of photographing opportunity.

Second Embodiment

Next, a description will be given of a digital camera which is an electronic device according to a second embodiment with reference to FIG. 10 and FIGS. 11A to 11C. In the second embodiment, instead of enabling the subject having the distance to the eyepoint coordinate which is not more than the specific distance as the switching target of the main subject, the position of the eyepoint pointer is moved. With this, even in the state in which the eyepoint pointer is not completely on the subject area, it becomes possible to select the subject as the switching target.

The configuration of the digital camera according to the present embodiment is the same as that of the first embodiment, and part of the selection-switching control processing of the main subject is the same as that of the first embodiment. In the following description, portions different from the first embodiment will be mainly described, and the same components and the same processing steps are designed by the same reference numerals and the detailed description thereof will be omitted.

Figure 10:
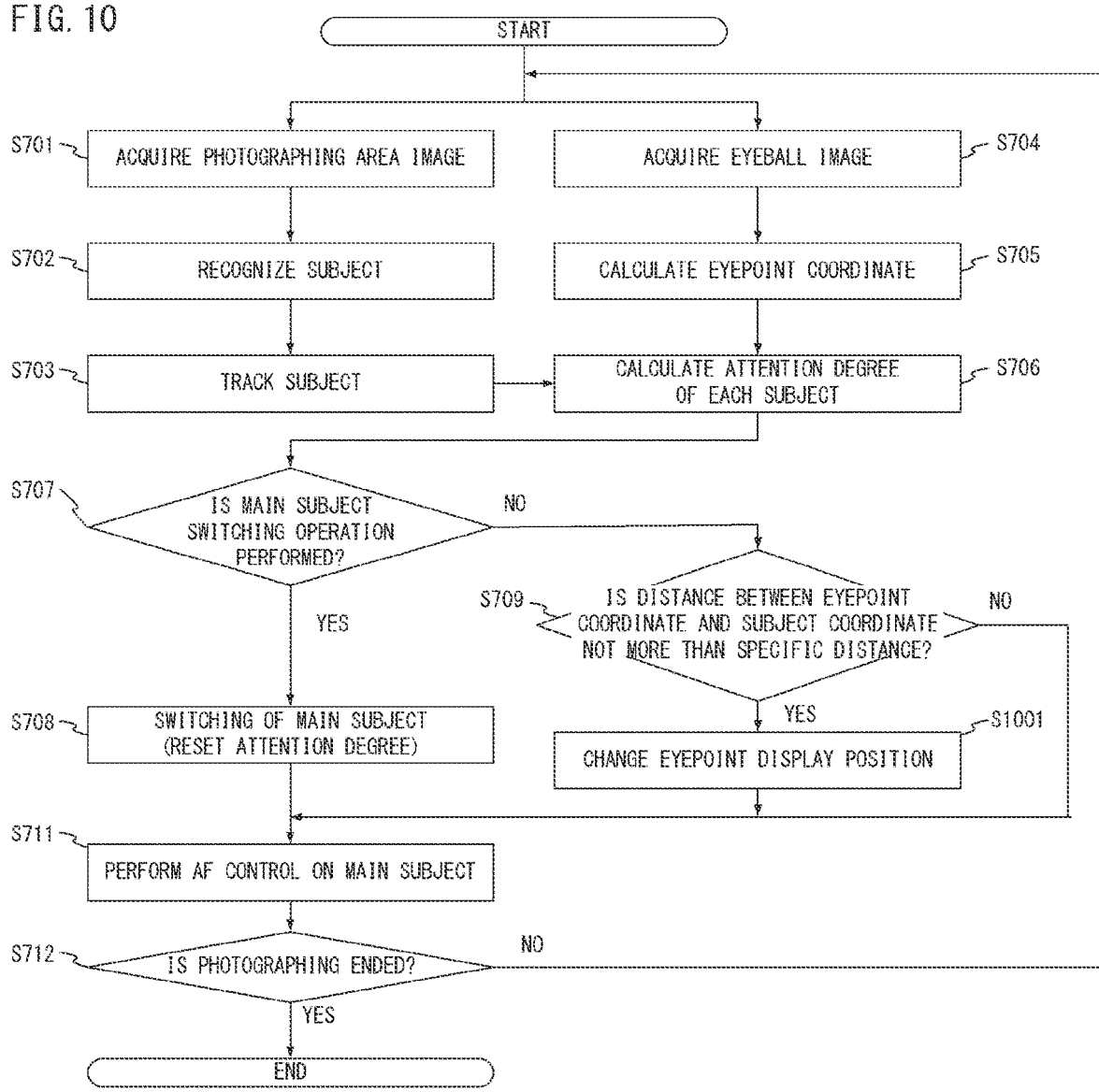
FIG. 10 is a flowchart showing the switching control processing of the main subject of a second embodiment.
Figure 11A:
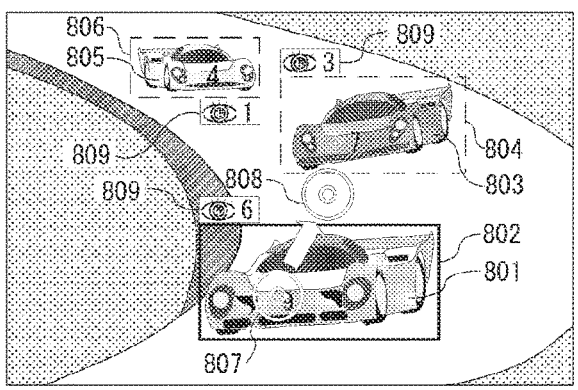
FIGS. 11A to 11C are schematic views showing the switching control processing of the main subject of the second embodiment.
Figure 11B:
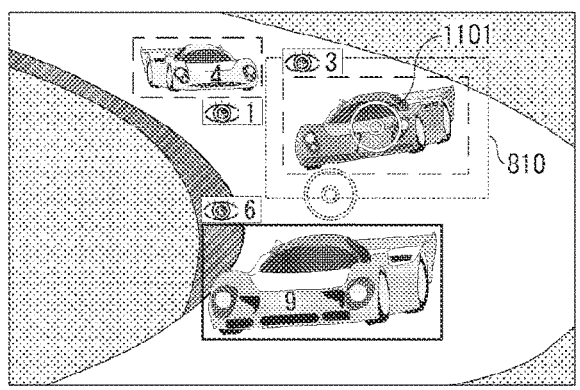
Figure 11C:
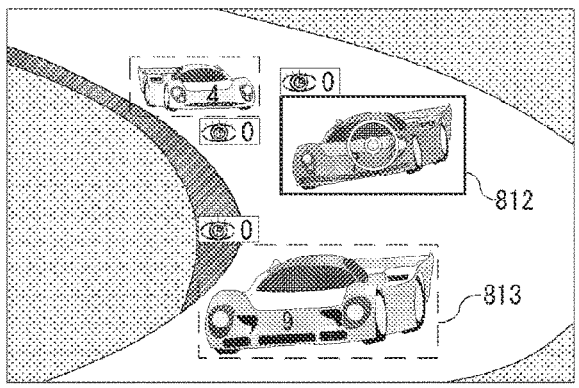

FIG. 10 is a view showing a flowchart of the selection-switching control processing of the main subject of the digital camera 100 according to the present embodiment, and FIGS. 11A to 11C are views schematically explaining the selection-switching control processing of the main subject of the present embodiment. Hereinafter, processing executed in FIG. 10 will be described with reference to FIG. 10 and FIGS. 11A to 11C.

When photographing by the user is started, the CPU 114 starts the selection-switching control processing of the main subject, and two processing steps in Step S701 and Step S704 are executed in parallel with each other. Note that Steps S701 to S709 are the same processing steps as those of the first embodiment.

Next, in Step S1001, the CPU 114 moves the eyepoint pointer to the coordinate which is on the subject having the distance to the eyepoint coordinate which is not more than the specific distance. Subsequently, the CPU 114 establishes a state in which the subject on the eyepoint pointer can be determined as the switching target of the main subject, and outputs a command to perform display for notifying the user of the state to the display control unit 112. Herein, the display of the notification to the user is, e.g., display in which the position of the eyepoint pointer 808 is changed to a position on a subject 1101 as shown in FIG. 11B. Note that, as a display form of the movement of the eyepoint pointer 808 from the position of the eyepoint pointer 808 in FIG. 11A to the position of the eyepoint pointer 808 in FIG. 11B, any display form can be adopted. For example, the eyepoint pointer 808 in FIG. 11A may be switched to the display in FIG. 11B instantly, and movement display in which the eyepoint pointer 808 in FIG. 11A is attracted to the position of the eyepoint pointer 808 in FIG. 11B may also be adopted. When the eyepoint coordinate and the display position of the eyepoint pointer are changed in Step S1001, the processing proceeds to Step S711. The processing in Steps S711 and S712 is the same as that of the first embodiment.

As described thus far, by application of the movement range of the eyepoint coordinate determined based on the attention degree of each subject, the eyepoint pointer is moved even in a state in which the eyepoint pointer is not on the subject, and it becomes possible to select the subject as the switching target of the main subject. With this, in the case where the switching operation of the main subject is performed by the position designation by the line of sight of the user and the determination operation by the button operation, it becomes possible to improve the responsiveness of the selection-switching operation of the main subject, and achieve a reduction in the loss of photographing opportunity.

Third Embodiment

Next, a description will be given of a digital camera according to a third embodiment with reference to FIG. 12 and FIGS. 13A to 13C. In the third embodiment, a description will be given of an example of the selection-switching processing of the main subject in the case where the determination when the subject is selected is performed not by the button operation but by a gaze determination.

The configuration of the digital camera according to the present embodiment is the same as that of the first embodiment, and part of the selection-switching control processing of the main subject is the same as that of the first embodiment. In the following description, portions different from the first embodiment will be mainly described, and the same components and the same processing steps are designated by the same reference numerals and the detailed description thereof will be omitted.

Figure 12:
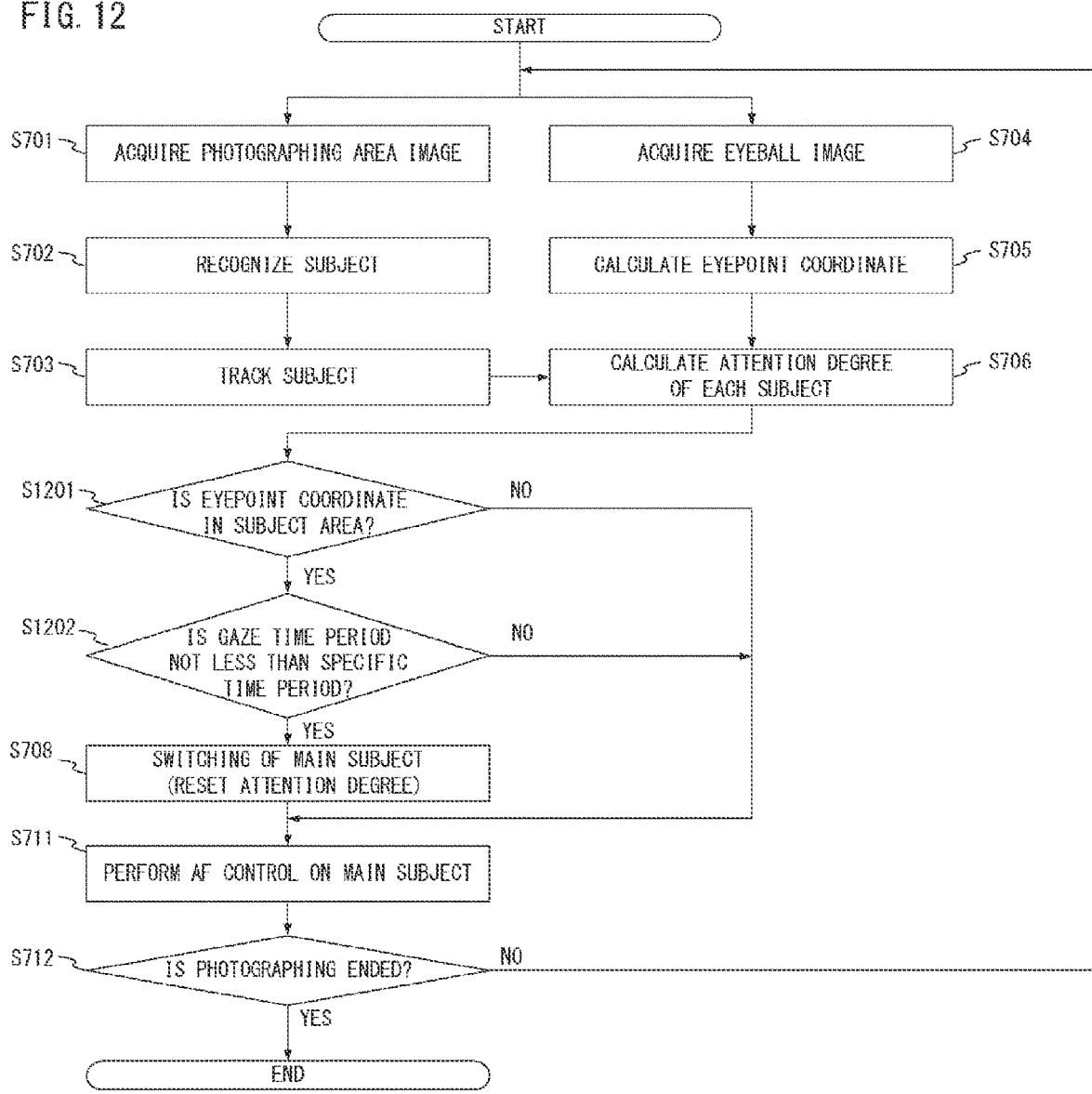
FIG. 12 is a flowchart showing the switching control processing of the main subject of a third embodiment.
Figure 13A:
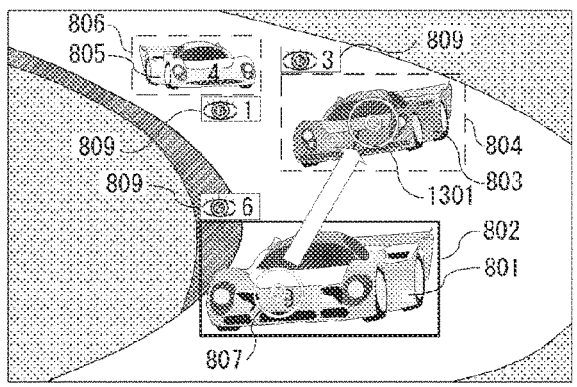
FIGS. 13A to 13C are schematic views showing the switching control processing of the main subject of the third embodiment.
Figure 13B:
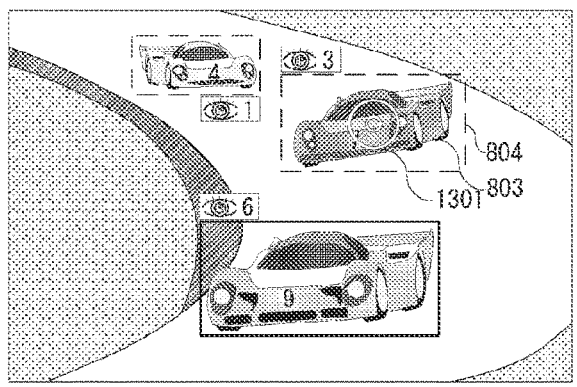
Figure 13C:
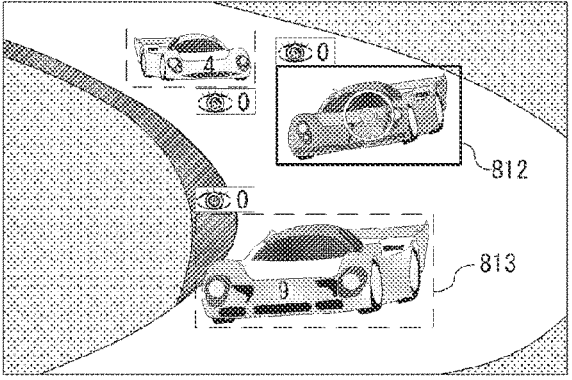

FIG. 12 is a view showing a flowchart of the selection-switching control processing of the main subject of the digital camera 100 according to the present embodiment, and FIGS. 13A to 13C are views schematically explaining the selection-switching control processing of the main subject of the present embodiment. Hereinafter, processing executed in FIG. 12 will be described with reference to FIG. 12 and FIGS. 13A to 13C.

When photographing by the user is started, the CPU 114 starts the selection-switching control processing of the main subject, and two processing steps in Step S701 and Step S704 are executed in parallel with each other. Steps S701 to S706 are the same processing steps as those of the first embodiment.

Next, in Step S1201, the CPU 114 determines whether or not the eyepoint coordinate is present in the subject area of the subject other than the main subject. As a specific example, as shown in FIG. 13A, the position of the eyepoint pointer indicative of the eyepoint of the user is moved to the position of an eyepoint pointer 1301 in the subject area 804 from the position of the eyepoint pointer 807. At this point, the CPU 114 determines that the eyepoint coordinate of the user is present in the subject area 804 of the subject 803. In the case where it is determined that the eyepoint coordinate is present in the subject area of the subject other than the main subject (S1201: YES), the processing proceeds to Step S1202. On the other hand, in the case where it is determined that the eyepoint coordinate is not present in the subject area of the subject other than the main subject (S1201: NO), the processing proceeds to Step S711.

In Step S1202, the CPU 114 reads a gaze time period of the user stored in the memory 107 in Step S705, and determines whether or not the gaze time period is not less than a specific time period. For example, as shown in FIG. 13B, after the eyepoint pointer 1301 moves into the subject area 804, the eyepoint pointer 1301 continuously stays in the subject area 804 of the subject 803 for the specific time period or longer. At this point, the CPU 114 determines that the gaze time period is not less than the specific time period, and determines that the determination operation for switching the main subject has been performed. Herein, the specific time period serving as a threshold for performing the gaze determination is, e.g., a threshold time period which is preset, e.g., when the attention degree of the subject 803 is zero. This time period is set to be shorter as the attention degree is higher, and the subject having the higher attention degree has a shorter required time period of the gaze determination. In the case where it is determined that the gaze time period is not less than the specific time period (S1202: YES), the processing proceeds to Step S708. On the other hand, in the case where it is determined that the gaze time period is less than the specific time period (S1202: NO), the processing proceeds to Step S711. The processing in Step S708 and Steps S711 and S712 is the same processing as that of the first embodiment.

As described thus far, the threshold time period of the gaze determination is set based on the attention degree of each subject, whereby the subject having the higher attention degree has the shorter time period required until the subject having the higher attention degree is determined as the switching target of the main subject. With this, in the case where the switching operation of the main subject is performed by the position designation by the line of sight of the user and the determination operation by the gaze determination, it becomes possible to improve the responsiveness of the selection-switching operation of the main subject, and achieve a reduction in the loss of photographing opportunity.

Fourth Embodiment

Next, a description will be given of a digital camera according to a fourth embodiment with reference to FIG. 14 and FIGS. 15A to 15D. In the fourth embodiment, a description will be given of an example of the selection-switching processing of the main subject in the case where the determination when the subject is selected is not performed based on the processing which uses the eyepoint position of the user but is performed by the button operation.

The configuration of the digital camera according to the present embodiment is the same as that of the first embodiment, and part of the selection-switching control processing of the main subject is the same as that of the first embodiment. In the following description, portions different from the first embodiment will be mainly described, and the same components and the same processing steps are designated by the same reference numerals and the detailed description thereof will be omitted.

FIG. 14 is a view showing a flowchart of the selection-switching control processing of the main subject of the digital camera 100 according to the present embodiment, and FIGS. 15A to 15D are views schematically explaining the selection-switching control processing of the main subject of the present embodiment. Hereinafter, processing executed in FIG. 14 will be described with reference to FIG. 14 and FIGS. 15A to 15D.

When photographing by the user is started, the CPU 114 starts the selection-switching control processing of the main subject, and two processing steps in Step S701 and Step S704 are executed in parallel with each other. Steps S701 to S708 are the same processing steps as those of the first embodiment.

Next, in Step S1401, the CPU 114 determines whether or not the user has performed the operation of selecting the subject for switching of the main subject serving as the AF control target with a specific operation of an arrow key of the operation unit 115. Herein, the selection operation of the subject is an operation of switching selection of the subject serving as the subject candidate for the main subject displayed in the display unit 113. In the present step, a determination of whether or not the operation of determining the selected subject as the main subject is not performed, and this determination is performed in Step S707. In the case where it is determined that the selection operation of the subject has been performed by the user (S1401: YES), the processing proceeds to Step S1402. On the other hand, in the case where it is determined that the selection operation of the subject is not performed by the user (S1401: NO), the processing proceeds to Step S711.

Figure 15A:
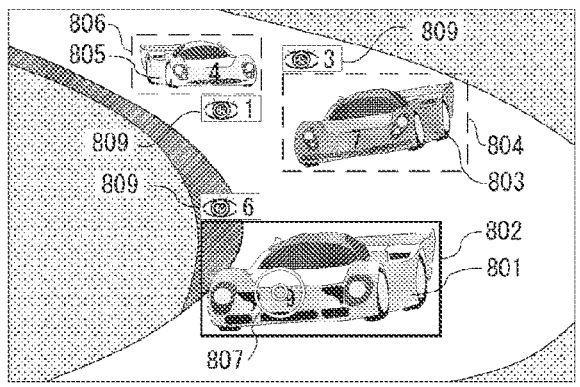
FIGS. 15A to 15D are schematic views showing the switching control processing of the main subject of the fourth embodiment.
Figure 15B:
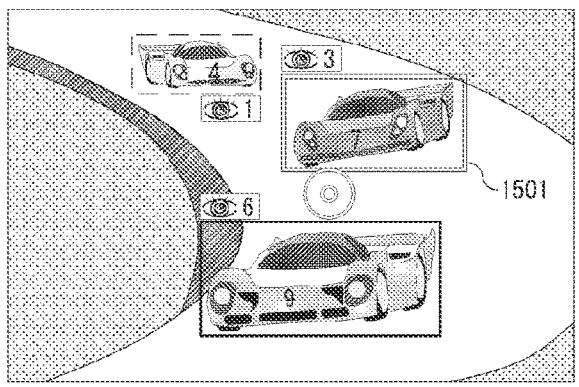
Figure 15C:
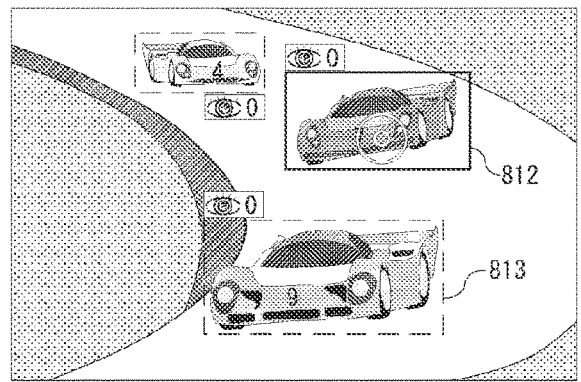

In Step S1402, the CPU 114 sequentially selects subjects in descending order of the attention degree as the subject candidate for the switching target of the main subject in response to the selection operation by the user, and output a command to perform display for notifying the user of a selection state of the subject to the display control unit 112. The display of the notification to the user is, e.g., display with a double frame 1501 in FIG. 15B, and is different from the thick-line frame 802 indicative of the main subject 801 serving as the AF control target or the broken-line frame 806 indicative of the subject area of the subject other than the main subject. In addition, FIG. 15B shows a display state of the display unit 113 when the subject selection operation is performed once by the user, and shows that the subject 803 having the highest attention degree other than that of the main subject 801 is selected as the switching target of the main subject. After the selection state of the subject serving as the subject candidate for the main subject is displayed in Step S1402, the processing proceeds to Step S711. Steps S711 and S712 are the same processing steps as those of the first embodiment.

Figure 15D:
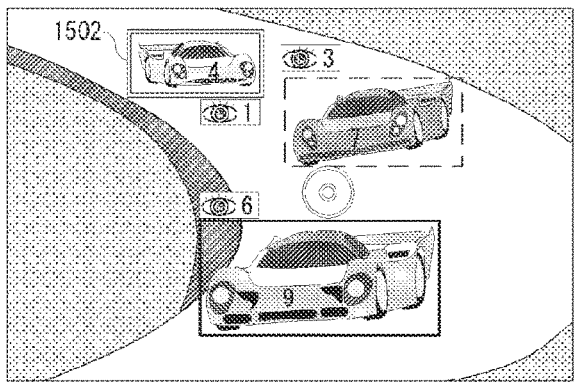

FIG. 15D shows a state in which the selection operation of the subject is performed one more time by the user in the state of FIG. 15B. More specifically, after the processing in Step S1402 is executed and the display state of the display unit 113 becomes the state shown in FIG. 15B, the processing proceeds to Step S711, and the AF control is executed on the main subject 801. Subsequently, after the processing returns to Steps S701 and S704 from Step S712, the processing in Steps S701 to S706 is executed and the processing proceeds to Step S1401 from Step S707. Subsequently, the selection operation of the subject is performed one more time by the user, whereby the processing proceeds to Step S1402 from Step S1401. In Step S1402, as shown in FIG. 15D, the display state of the display unit 113 becomes a state in which the subject 805 having the second highest attention degree after the attention degree of the subject 803 other than the attention degree of the main subject 801 is selected as the switching target of the main subject. Note that, in the case where the subject having the second highest attention degree after that of the currently selected and displayed subject other than that of the main subject is not present, display control may be performed such that a state in which, among subjects other than the main subject, a subject having the highest attention degree is selected again is established. In examples in FIGS. 15A to 15D, when the user performs the selection operation of the subject one more time in the state in which the subject 805 is selected as the switching target of the main subject as shown in FIG. 15D, the display state of the display unit 113 returns to the state shown in FIG. 15B.

As described thus far, the subject serving as the subject candidate for the switching target of the main subject is selected and displayed in display order based on the attention degree of each subject, whereby the subject having the higher attention degree is selected as the switching target of the main subject more preferentially. That is, the display control unit 120 displays, among a plurality of subjects, the subject candidate for the switching target such that the attention degree of each subject candidate is distinguishable. With this, in the case where the switching operation of the main subject is performed by the subject selection and the determination operation by the button operation of the user, it becomes possible to improve the responsiveness of the selection-switching operation of the main subject and achieve a reduction in the loss of photographing opportunity.

While the present invention has been described in detail based on its preferred embodiments thus far, the present invention is not limited to these specific embodiments, and various forms without departing from the gist of the invention are also included in the present invention. Parts of the above-described embodiments may be combined appropriately.

While the example in which the present invention is applied to the digital camera has been described in each of the above-described embodiments, the electronic device to which the present invention can be applied is not limited to the digital camera. For example, the present invention can also be applied to a personal computer, a smartphone, a tablet, a head-mounted display, and smart glasses. In addition, an image to be displayed is not limited to an image captured by the imaging apparatus. For example, the present invention can also be applied to, e.g., the case where an item is selected from a screen (an image, e.g., a menu screen or a desktop screen) including a plurality of items (objects).

In addition, for example, while the example of the detection method which is based on the assumption that the user looks into the finder has been described as the line-of-sight detection method in the first embodiment, the detection method may detect the line of sight in the case where the user looks at display on a back panel. In addition, while the form in which the subject other than the main subject is assumed to be used as the switching target of the main subject, and the attention degree of the main subject is handled as zero has been described, the present invention is not limited thereto. The main subject may also be handled similarly to the subject other than the main subject.

In addition, while the example in which the target of the selection-switching operation of the main subject is the subject other than the main subject has been described in the third embodiment, the processing may be executed such that the main subject is re-selected by using the main subject as the processing target similarly to the other subjects. With this, it becomes possible to perform what is called re-catching control of the subject.

Note that each functional unit of each embodiment (each modification) described above may or may not be individual hardware. Functions of two or more functional units may be implemented by common hardware. Each of a plurality of functions of one functional unit may be implemented by individual hardware. Two or more functions of one functional unit may be implemented by common hardware. In addition, each functional unit may or may not be implemented by hardware such as ASIC, FPGA, or DSP. For example, an apparatus may have a processor and a memory (storage medium) which stores a control program. Further, functions of at least part of functional units of the apparatus may be implemented by the processor which reads the control program from the memory and executes the control program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve the responsiveness by controlling the selection-switching operation of the main subject on which the AF control is performed based on the attention degree of each subject calculated from the area of the subject which is recognized by the eyepoint of the user and the image processing. In addition, according to the present disclosure, it is possible to reduce the loss of photographing opportunity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-066950, filed on Apr. 14, 2022, which is hereby incorporated by reference herein in its entirety.

What is claimed is:

1. An electronic device comprising:
   a processor; and
   a memory storing a program which, when executed by the processor, causes the electronic device to:
   detect an eyepoint of a user in an image which is captured by an imaging unit and is displayed in a display unit;
   track a plurality of subjects in the image;
   determine an attention degree of the user of each of the plurality of subjects based on the eyepoint of the user; and
   receive an operation by the user;
   display, among the plurality of subjects, a subject candidate serving as a switching target such that the subject candidate is distinguishable; and
   display the subject candidate serving as the switching target such that the attention degree of each subject candidate is distinguishable in a case where switching of a main subject is performed by the received operation.

2. The electronic device according to claim 1, wherein the program when executed by the processor causes the electronic device to determine a degree of inclusion of the eyepoint of the user detected in an area of the tracked subject as the attention degree.

3. The electronic device according to claim 2, wherein the degree of inclusion of the eyepoint of the user is the number of times of sampling or the number of display frames of an image in which the detected eyepoint of the user is present in the area of the subject, or the number of times of staying of the detected eyepoint of the user for a predetermined time period in the area of the subject.

4. The electronic device according to claim 1, wherein the program when executed by the processor causes the electronic device to select any of the plurality of subjects as the main subject based on the attention degree of each of the plurality of subjects and select, from among the plurality of subjects, a subject having a higher attention degree preferentially as the main subject.

5. The electronic device according to claim 1, wherein the program when executed by the processor causes the electronic device to select, from among the plurality of subjects, the main subject based on the attention degree of each subject other than a subject selected as the main subject.

6. The electronic device according to claim 1, wherein the program when executed by the processor causes the electronic device to set the attention degree of the tracked subject back to an initial value in a case where the tracked subject ceases to be present in the image.

7. The electronic device according to claim 1, wherein the program when executed by the processor causes the electronic device to display the determined attention degrees of the plurality of subjects in the display unit by using at least one of a numerical value, a diagram, and a color.

8. The electronic device according to claim 1, wherein the program when executed by the processor causes the electronic device to determine a gaze time period used in a gaze determination based on the attention degree of the subject in a case where switching of the main subject is performed by position designation by the eyepoint of the user and the gaze determination of the eyepoint of the user.

9. An electronic device comprising:
a processor; and
a memory storing a program which, when executed by the processor, causes the electronic device to:
detect an eyepoint of a user in an image which is captured by an imaging unit and is displayed in a display unit;
track a plurality of subjects in the image;
determine an attention degree of the user of each of the plurality of subjects based on the eyepoint of the user;
receive an operation by the user; and
determine a subject candidate serving as the main subject based on a distance between the subject and the eyepoint of the user and the attention degree in a case where switching of the main subject is performed by position designation by the eyepoint of the user in the image and the received operation.

10. The electronic device according to claim 9, wherein the program when executed by the processor causes the electronic device to determine a subject having the distance between the subject and the eyepoint of the user which is not more than a threshold distance determined according to the attention degree as the subject candidate.

11. The electronic device according to claim 9, wherein the program when executed by the processor causes the electronic device to notify the user that it is possible to switch the main subject.

12. An electronic device comprising:
a processor; and
a memory storing a program which, when executed by the processor, causes the electronic device to:
detect an eyepoint of a user in an image which is captured by an imaging unit and is displayed in a display unit;
track a plurality of subjects in the image;
determine an attention degree of the user of each of the plurality of subjects based on the eyepoint of the user;
receive an operation by the user; and
determine a display position of the eyepoint of the user in the image based on a distance between the subject and the eyepoint of the user and the attention degree in a case where switching of the main subject is performed by position designation by the eyepoint of the user in the image and the received operation.

13. The electronic device according to claim 12, wherein the program when executed by the processor causes the electronic device to determine a position on a subject having the distance between the subject and the eyepoint of the user which is not more than a threshold distance determined according to the attention degree as the display position of the eyepoint of the user.

14. An electronic device comprising:
a processor; and
a memory storing a program which, when executed by the processor, causes the electronic device to:
display a plurality of subjects in an image which is captured by an imaging unit and is displayed in a display unit such that the plurality of subjects can be selected;
determine an attention degree of a user of each of the plurality of subjects, wherein
the attention degree of the user of each of the plurality of subjects is based at least in part on a time period for which the user has looked at each of the plurality of subjects;
receive an operation by the user;
display, among the plurality of subjects, a subject candidate serving as a switching target such that the subject candidate is distinguishable; and
display the subject candidate serving as the switching target such that the attention degree of each subject candidate is distinguishable in a case where switching of a main subject is performed by the received operation.

15. An electronic device comprising:
a processor; and
a memory storing a program which, when executed by the processor, causes the electronic device to:
display an image captured by an imaging unit in a display unit;
detect an eyepoint of a user in the image displayed in the display unit;
select any of a plurality of subjects as a main subject;
determine an attention degree of the user of each of the plurality of subjects based on the eyepoint of the user;
receive an operation by the user, wherein switching of the main subject selected by the received operation is allowed;
display, among the plurality of subjects, a subject candidate serving as a switching target such that the subject candidate is distinguishable; and
display the subject candidate serving as the switching target such that the attention degree of each subject candidate is distinguishable in a case where switching of the main subject is performed by the received operation.

16. An electronic device comprising:
a processor; and
a memory storing a program which, when executed by the processor, causes the electronic device to:
detect an eyepoint of a user in an image displayed in a display unit;
determine an attention degree of the user for each of a plurality of objects in the image based on the eyepoint of the user;
receive an operation by the user;
display, among the plurality of objects, an object candidate serving as a switching target such that the object candidate is distinguishable; and
display the object candidate serving as the switching target such that the attention degree of each object candidate is distinguishable in a case where switching of a main object is performed by the received operation.

17. A control method of an electronic device, the method comprising:
detecting an eyepoint of a user in an image which is captured by an imaging unit and is displayed in a display unit;
tracking a plurality of subjects in the image;
determining an attention degree of the user of each of the plurality of subjects based on the eyepoint of the user;
receiving an operation by the user;
displaying, among the plurality of subjects, a subject candidate serving as a switching target such that the subject candidate is distinguishable; and
displaying the subject candidate serving as the switching target such that the attention degree of each subject candidate is distinguishable in a case where switching of a main subject is performed by the received operation.

18. A non-transitory computer readable medium in which a program for causing a computer to execute the control method of claim 17 is stored.

* * * * *